US008528249B1

(12) United States Patent
Kao (10) Patent No.: US 8,528,249 B1
(45) Date of Patent: Sep. 10, 2013

(54) LAWN AND/OR GARDEN EDGING DEVICE

(76) Inventor: Brian W. Kao, Farmington Hills, MI (US)

( * ) Notice: Subject to any disclaimer, the term of this patent is extended or adjusted under 35 U.S.C. 154(b) by 0 days.

(21) Appl. No.: 12/897,069

(22) Filed: Oct. 4, 2010

(51) Int. Cl.
*A01G 1/08* (2006.01)

(52) U.S. Cl.
USPC .................................. 47/33; 52/102

(58) Field of Classification Search
USPC .................................. 47/33; 52/102
See application file for complete search history.

(56) References Cited

U.S. PATENT DOCUMENTS

| 397,732 | A | * | 2/1889 | Landis | 47/33 |
|---|---|---|---|---|---|
| 619,352 | A | * | 2/1899 | Schaefer | 47/33 |
| 1,373,827 | A | * | 4/1921 | Nelson et al. | 43/107 |
| 1,843,108 | A | * | 2/1932 | Clayden | 47/33 |
| 2,891,352 | A | * | 6/1959 | Altman | 47/19.1 |
| 3,415,013 | A | * | 12/1968 | Galbraith | 47/73 |
| 3,520,082 | A | * | 7/1970 | Smith | 47/33 |
| 3,916,563 | A | * | 11/1975 | Tedesh | 47/33 |
| 3,955,801 | A | * | 5/1976 | Soriero, Jr. | 256/65.13 |
| 5,168,678 | A | * | 12/1992 | Scott et al. | 52/102 |
| 5,240,343 | A | * | 8/1993 | Strobl, Jr. | 404/7 |
| 5,414,956 | A | | 5/1995 | Kheradpir | 47/33 |
| 5,426,888 | A | * | 6/1995 | Gnaedig | 47/33 |
| 5,456,045 | A | | 10/1995 | Bradley et al. | 47/33 |
| 5,601,278 | A | * | 2/1997 | Graber | 256/66 |
| 5,675,930 | A | | 10/1997 | Cooper | 47/33 |
| 5,720,128 | A | * | 2/1998 | Smith et al. | 47/33 |
| 6,026,610 | A | | 2/2000 | Northrop et al. | 47/33 |
| 6,085,458 | A | * | 7/2000 | Gau | 47/33 |
| 6,327,815 | B1 | | 12/2001 | Becton et al. | 47/33 |
| 6,502,349 | B1 | | 1/2003 | Richet et al. | 47/33 |
| 6,548,184 | B1 | * | 4/2003 | Bishop | 428/582 |
| 6,779,297 | B2 | | 8/2004 | Conde | 47/33 |
| 6,938,369 | B2 | | 9/2005 | Zwier | 47/33 |
| D554,276 | S | | 10/2007 | Lu | 47/33 |
| 7,555,863 | B1 | | 7/2009 | Caldwell | 47/33 |
| 7,596,903 | B1 | | 10/2009 | Flanagan | 47/33 |
| 2004/0169172 | A1 | | 9/2004 | Stringer et al. | 256/67 |
| 2009/0013597 | A1 | | 1/2009 | Orton | 47/33 |

OTHER PUBLICATIONS

Permaloc World's Best Landscape Edging, http://www.permaloc.com/products/accessories.html, Aug. 3, 2010, pp. 1.
Pin & Sleeve System, Everedge, http://www.everedge.co.uk/pin-and-sleeve.htm, Aug. 3, 2010, pp. 1.

* cited by examiner

*Primary Examiner* — David Parsley
*Assistant Examiner* — Danielle Clerkley
(74) *Attorney, Agent, or Firm* — Christopher P. Maiorana, PC (57) ABSTRACT

An apparatus comprising a main portion, a connector and a receptacle. The main portion may have a top, a first side, a second side and a bottom. The connector may be rigidly positioned to extend from the main portion near said first side. The receptacle may be positioned within the main portion near the second side. The connector may be configured to lock into a second receptacle having a similar configuration as said first receptacle.

18 Claims, 11 Drawing Sheets

LAWN AND/OR GARDEN EDGING DEVICE

FIELD OF THE INVENTION

The present invention relates to lawn and/or garden devices generally and, more particularly, to a method and/or apparatus for implementing a lawn and garden edging device.

BACKGROUND OF THE INVENTION

Conventional lawn and garden edging products are often available at home improvement stores. Such edging devices are typically made with long, often black, extruded rolled plastic. Installation of such an extruded plastic edging includes digging a trench, using connectors to extend the edging further, and staking the edging into the ground. For installation on a hill, a 'V' notch is cut into the edging, or the edging is forced to bend into the ground.

Since conventional edging products are designed to be installed on a flat lawn, such products do not accommodate installation from a flat area to a hill. Over a period of time, conventional edging suffers from one or more of the following drawbacks:

1) the transition from a flat portion to a portion down hill becomes loose, due to plastic remembering its form, and pops up from the ground, while the remaining portion on flat land stays in the ground;

2) the edging does not look uniform from ground to top of edging, and the edging looks like it has been inserted too far in the ground, and some parts of edging is too far out when transitioning between an incline and flat land;

3) the connector between the extruded edgings pops out if not anchored;

4) the connector between curves pops out and the edging comes out.

U.S. Pat. No. 6,938,369 provides one solution for solving 'change of grade' issues when in edging. Such a solution deals with a secondary solution by adding a separate connector to existing edging strips. The connector still uses traditional edging for the remaining flat land, and is only used when the edging needs to tilt up and/or down based on the 'change of grade' of the landscape. U.S. Pat. No. 6,938,369 implements a nut/bolt/washer to implement a pivot. U.S. Pat. No. 6,502,349 pivots on a vertical axis, and does not separate or keep out mulch from grass.

It would be desirable to implement a lawn and/or garden edging that looks linear in height, even going up and down a transition from a hill to a flat surface. It would be desirable to implement such edging that pivots on a horizontal axis based on whatever grade change occurs between the edging panels, without the need for any sort of connectors.

SUMMARY OF THE INVENTION

The present invention concerns an apparatus comprising a main portion, a connector and a receptacle. The main portion may have a top, a first side, a second side and a bottom. The connector may be rigidly positioned to extend from the main portion near said first side. The receptacle may be positioned within the main portion near the second side. The connector may be configured to lock into a second receptacle having a similar configuration as said first receptacle.

The objects, features and advantages of the present invention include providing a lawn and/or garden edging device that may (i) provide a modular implementation, (ii) operate in a lawn and/or garden environment, (iii) be flexible to bend to form curves, (iv) allow the panels to pivot up and down based on the landscape change in grade, (v) allow for both curvature and pivoting on a change in grade, and/or (vi) be implemented without the need for a separate nut and bolt to connect the modular pieces.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figures 1, 2, 3, 4:
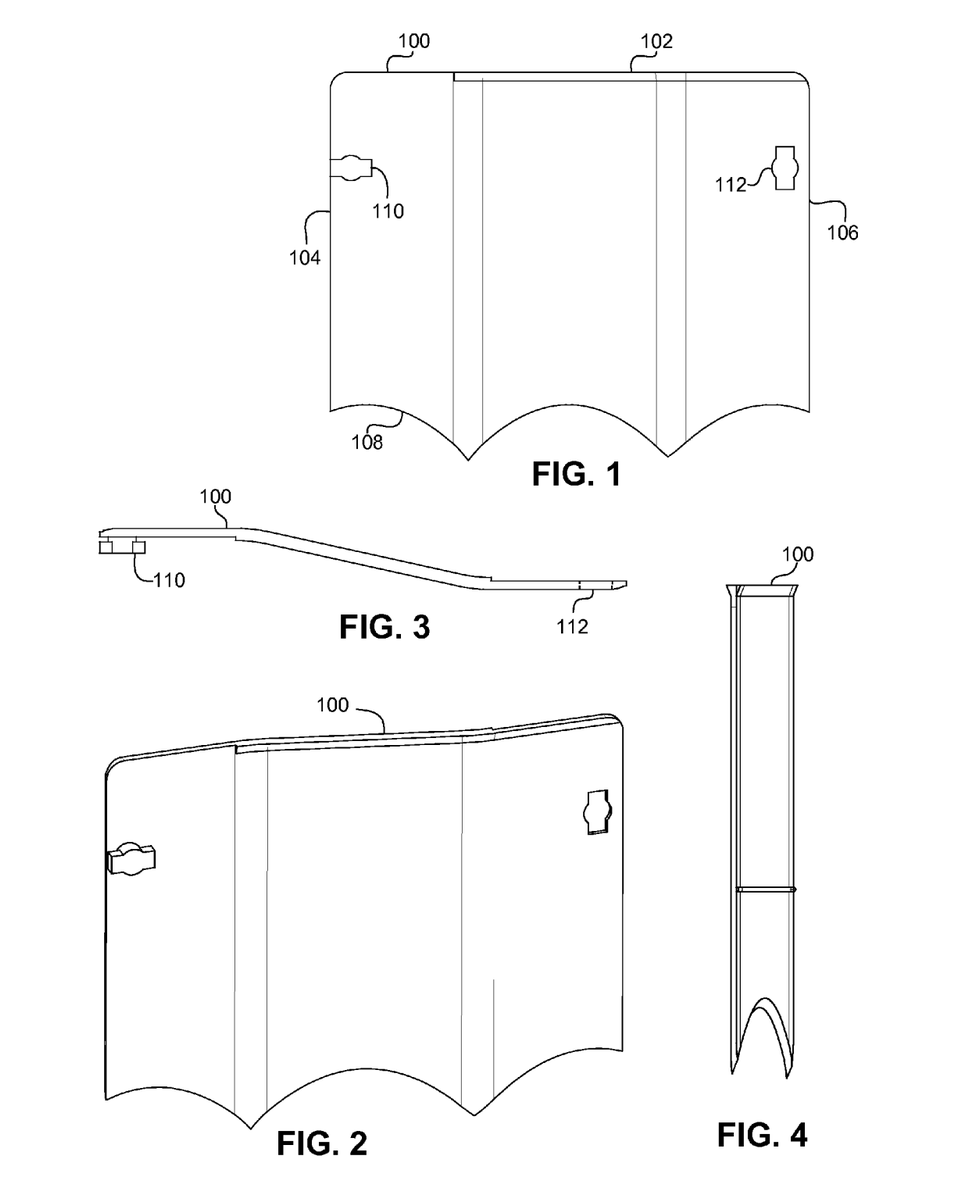
FIG. 1 is a diagram illustrating an embodiment of the present invention.
FIG. 2 is a perspective view of the embodiment of FIG. 1.
FIG. 3 is a top view of the embodiment of FIG. 1.
FIG. 4 is a side view of the embodiment of FIG. 1.

Referring to FIG. 1, a diagram of an apparatus 100 is shown in accordance with an embodiment of the present invention. The apparatus 100 generally comprises a top portion 102, a side portion 104, a side portion 106 and a bottom portion 108. The apparatus 100 may also include a connection piece 110 and a receptacle 112. The connection piece 110 may be configured to removably secure into the receptacle 112. The particular construction of the connection piece 110 may be varied to meet the design criteria of a particular implementation. While the apparatus 100 is shown with one connection piece 110 and one receptacle 112, the particular combination of the connection piece 110 and the receptacle 112 may be varied to meet the design criteria of a particular implementation. For example, the apparatus 100 may be implemented with two receptacles 112 and no connection piece 110. Such an implementation may be useful in a configuration used with a side portion (to be described in more detail in connection with FIG. 10-FIG. 13). However, the particular type of connection piece 110 and receptacle 112 implemented may be varied to meet the design criteria of a particular implementation. In one example, the connection piece 110 may be twisted approximately 90 degrees after being inserted into the receptacle 112. The connection piece 110 may be pushed through the receptacle at a first (unlocked) orientation, then twisted to a second (locked) orientation.

Referring to FIG. 2, a perspective view of the apparatus 100 is shown. Referring to FIG. 3, a top view of the apparatus 100 is shown. Referring to FIG. 4, a side view of the apparatus 100 is shown. The apparatus 100 may be used to implement an edging strip having an up and/or down pivoting feature. When a plurality of the apparatus 100 are connected together, the pivot may be implemented on a horizontal axis to accommodate a yard and/or landscape and that has change in grade from flat land to a slope.

The apparatus 100 may resolve the need in the art to provide a separate connector to use along with other edging products. The apparatus 100 may allow a homeowner to connect as many sections of the apparatus 100a-100n needed to form an edging strip having a desired length. For example, the length of the edging strip may be adjusted to match the length of the landscape to be sectioned off. The apparatus 100 may allow the homeowner to 1) provide flexibility to bend the edging strip to form curves, 2) provide panels to pivot up and down based on the change in grade of the lawn and/or garden, and/or 3) allow for both curvature and pivoting up and/or down hill (e.g., a transition to/from a hill to/from flat land). In one example, the apparatus 100 may be implemented without a separate nut/bolt/washer.

Figure 5A:
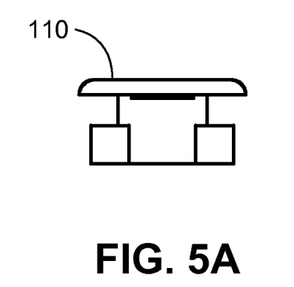
FIG. 5A-5D are diagrams illustrating a close up view of the connection piece of FIG. 1.
Figure 5B:
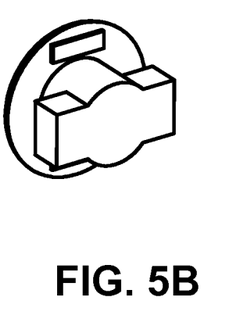
Figure 5C:
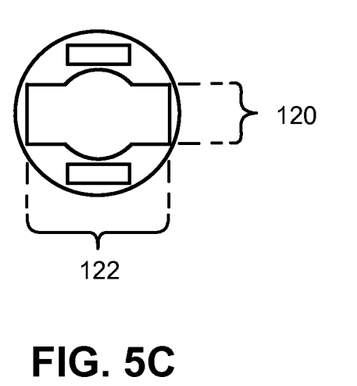
Figure 5D:
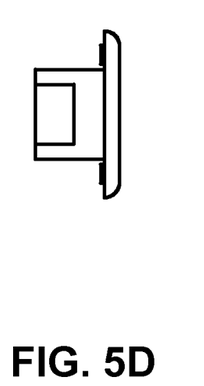

Referring to FIGS. 5A-5D, close up views of one embodiment of the connection piece 110 is shown. The connection piece 110 is shown with a "lock cap" configuration. FIG. 5A illustrates a side view. FIG. 5B illustrates a perspective view. FIG. 5C illustrates a top view. FIG. 5D illustrates another side view. The connection piece 110 may be configured to fit within the receptacle (such as the receptacle 112 shown in FIG. 1 or the receptacles 112a-112n to be described in connection with FIG. 10) at a first angle. The connection piece 110 normally has a short side 120 and a long side 122. After the insertion piece 110 is inserted into the receptacle 112, the apparatus 100 is normally twisted at an approximate 90 degree rotation. Such a twist locks the insertion piece 110 into the receptacle 112. However, the particular angle between the insertion piece 110 of the receptacle 112 may vary about an approximate 90 degree orientation. The variance about the 90 degree rotation may accommodate the changing grade in the ground, which may allow the apparatus 100 to be installed on a hill. The connection piece 110 may be mounted directly to the apparatus 100, or may be implemented as a separate piece. When the connection piece 110 is implemented as a separate piece, the connection piece 110 may be used to connect two receptacles 112 (such as with the corner piece to be described in connection with FIGS. 10-13). In one example, the connection piece 110 may be used to provide a cap in an unused receptacle 112. The particular configuration of the connection piece may be varied. For example, a round cap may be implemented. In another example, a push pin design may be implemented.

Figures 6, 7:
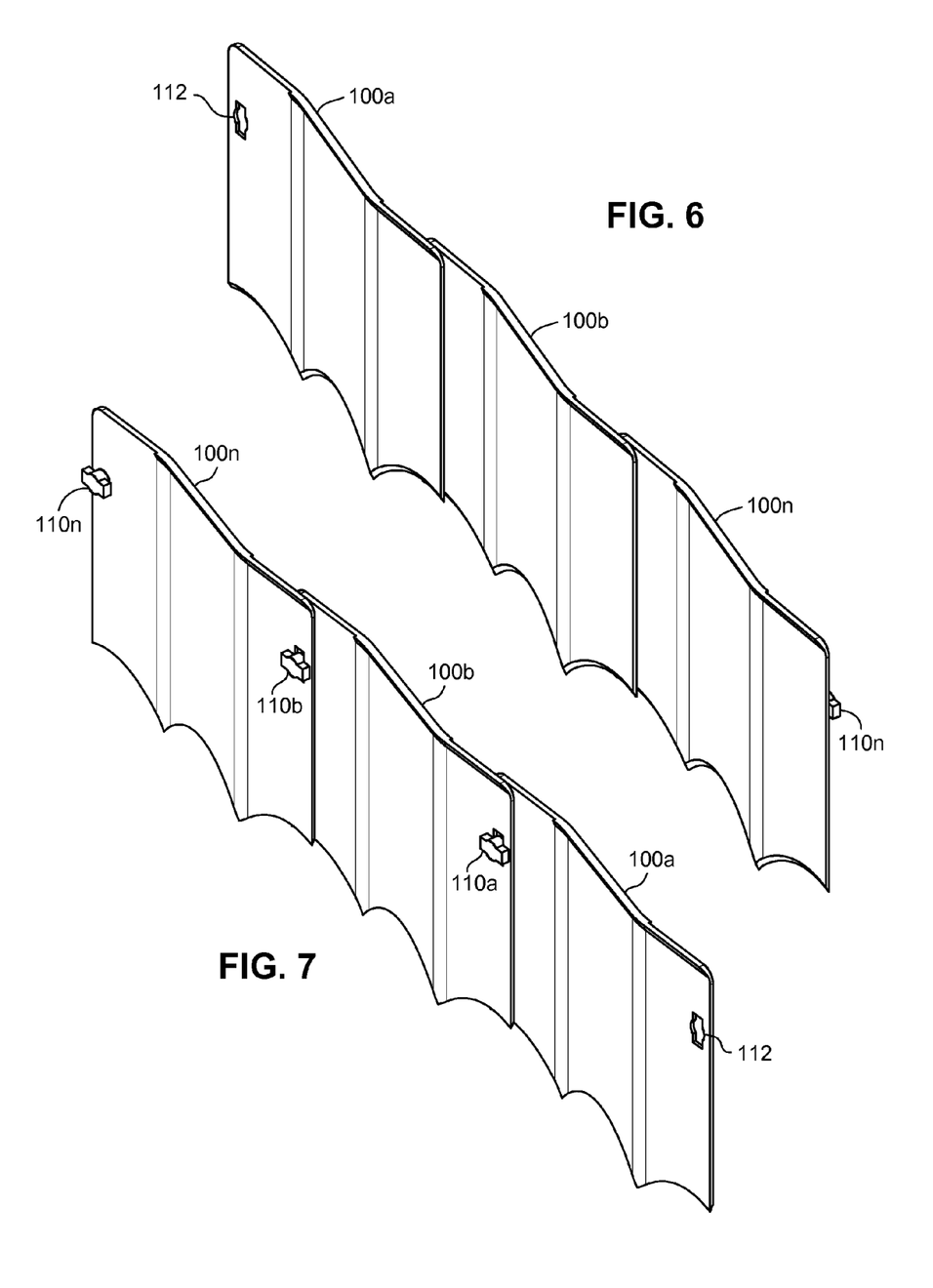
FIG. 6 is a diagram illustrating a plurality of the pieces of FIG. 1 arranged to form an edging strip.
FIG. 7 is a diagram of the back portion of FIG. 6 showing the connections between a plurality of the pieces of FIG. 1.

Referring to FIG. 6, a plurality of the apparatus 100a-100n are shown. The apparatus 100a-100n are shown forming a edging strip. The particular number of apparatus 100a-100n may be varied to meet the design criteria of a particular implementation. In particular, the length of the edging may be varied by adding to the number of apparatus 100a-100n that are connected together. The apparatus 100a shows the receptacle 112 exposed.

Referring to FIG. 7, a back view of the plurality of apparatus 100a-100n is shown. The receptacle 112 is viewable on the apparatus 100a. A plurality of connection pieces 100a-100n are shown on the respective apparatus 100a-100n.

Figure 8:
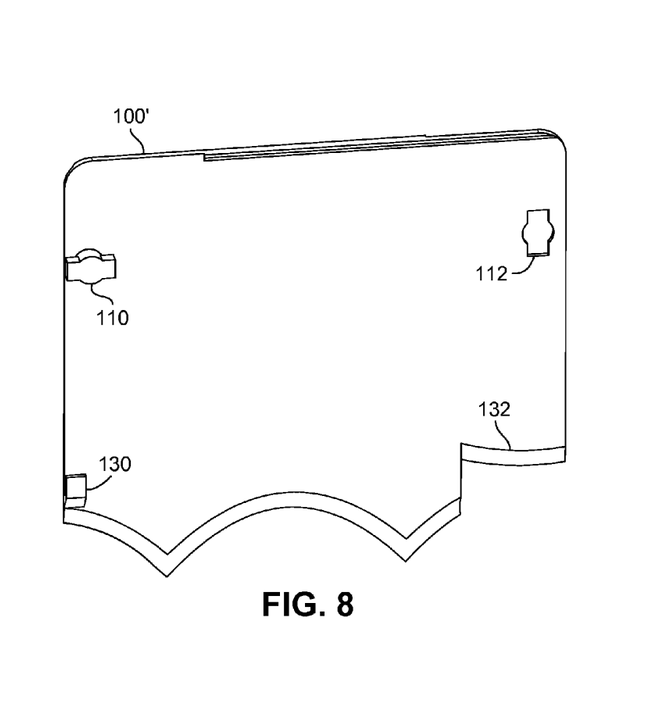
FIG. 8 is a diagram illustrating an alternate embodiment.
Figure 9:
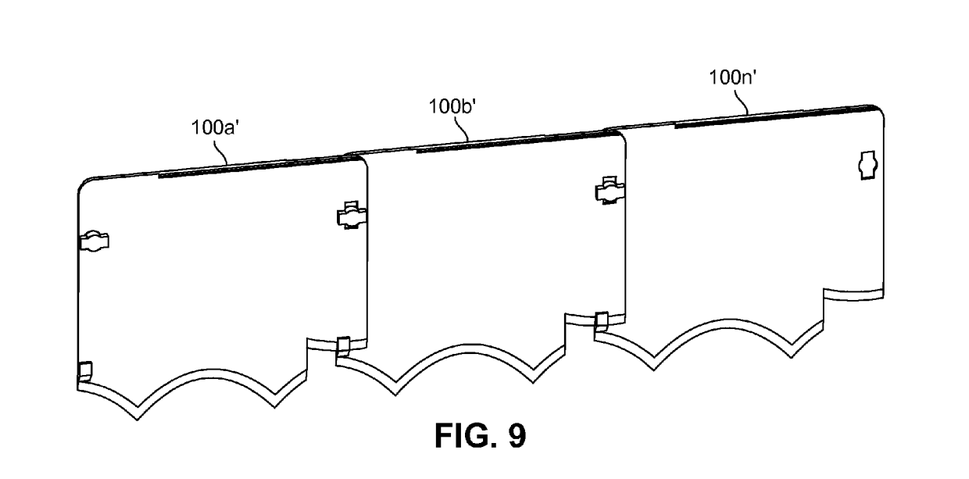
FIG. 9 is a diagram illustrating a plurality of the pieces of FIG. 8 arranged to form an edging strip.

Referring to FIG. 8, an apparatus 100' is shown implementing an embodiment of the present invention. The apparatus 100' includes a lower lock 130 and a portion 132. The lower lock 130 may be configured to capture the portion 132. The lower lock 130 and the portion 132 may be implemented as a slide and lock configuration, or with any type of the connection piece 110 and/or the receptacle 112 described throughout the specification. The lower lock 130 and the portion may be implemented to secure the apparatus 100' at a second location. The second secured location may provide a more secure placement of the edging strip. Referring to FIG. 9, a edging strip is shown comprising a plurality of the apparatus 100a'-100n'. The portion 132 of one apparatus (e.g., 100a') is shown connected to the lower lock 130 of another apparatus (e.g., 100b').

Figure 10:
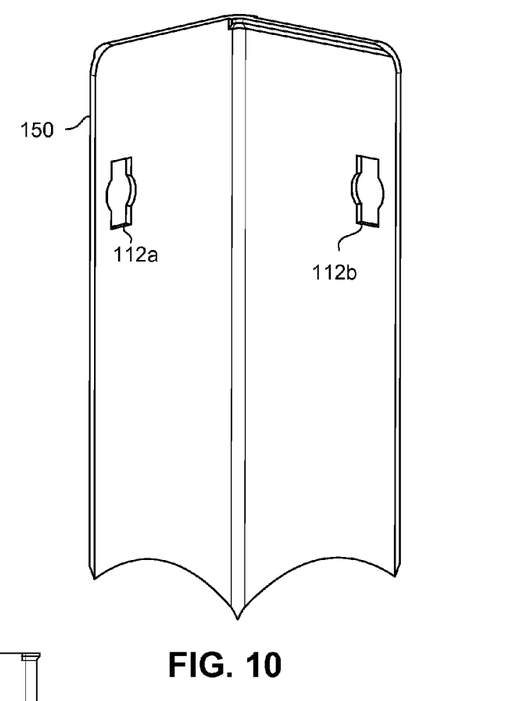
FIG. 10 is a diagram of a corner piece.
Figure 11:
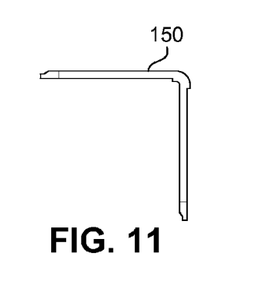
FIG. 11 is a top view of the corner piece of FIG. 10.
Figure 12:
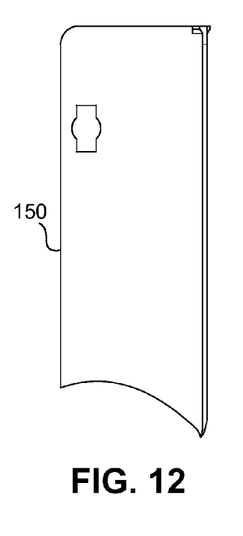
FIG. 12 is a side view of the corner piece of FIG. 10.
Figure 13:
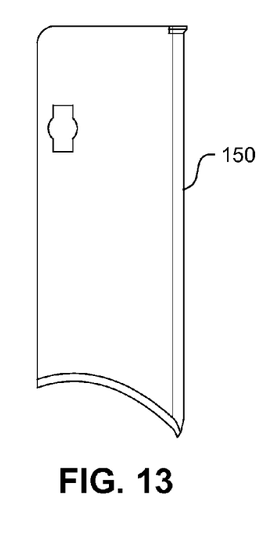
FIG. 13 is a second side view of the corner piece of FIG. 10.
Figure 14:
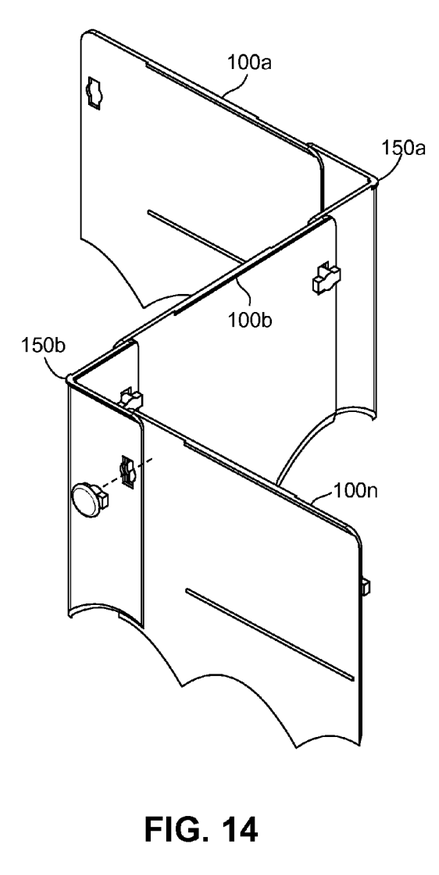
FIG. 14 is a diagram illustrating a plurality of the pieces of FIG. 1 (or FIG. 25) and FIG. 10 arranged to form an edging strip.
Figure 15:
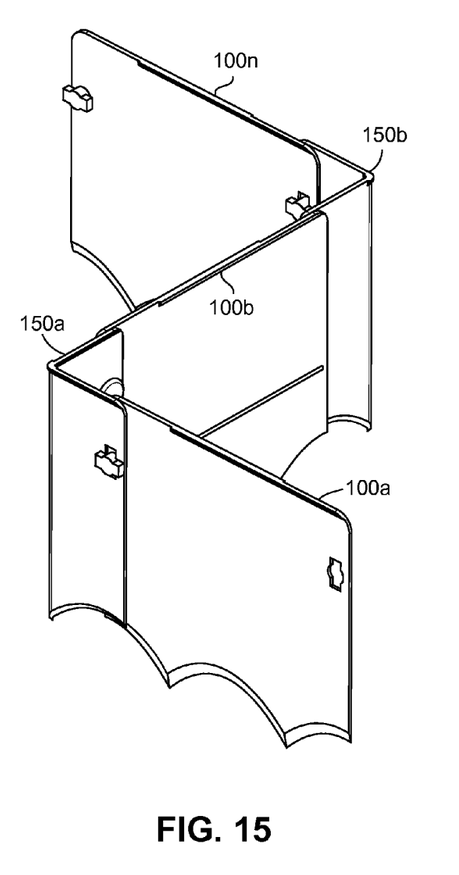
FIG. 15 is a diagram illustrating the back of the plurality of pieces of FIG. 14.

Referring to FIG. 10, an example of a corner piece 150 is shown. The corner piece 150 is shown having a receptacle 112a and a receptacle 112b. While the receptacle 112a and 112b are shown, the corner piece 150 may alternately be implemented with a connection piece 110 and a receptacle 112 and/or two or more connection pieces 110 and/or receptacles 112. Referring to FIG. 11, a top view of the corner piece 150 is shown. Referring to FIG. 12, a side view of the corner piece 150 is shown. Referring to FIG. 13, another side view of the corner piece 150 is shown. Referring to FIG. 14, a plurality of apparatus 100a-100n are shown connected to a plurality of corner pieces 150a-150b. Referring to FIG. 15, a plurality of apparatus 100a-100n are shown connected to a plurality of corner pieces 150a-150n. The corner pieces 150a-150n may accommodate a bend in direction of the edging strip. While a generally 90 degree bend is shown, the particular angle implemented may be varied to meet the design criteria of a particular implementation. For example, a 45 degree bend, a 30 degree bend, or other angle bend may be implemented.

Figure 16:
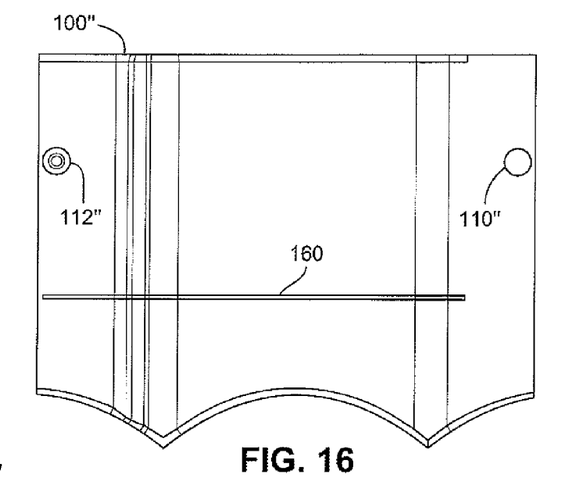
FIG. 16 is a diagram illustrating an alternate embodiment of the present invention.
Figure 17:
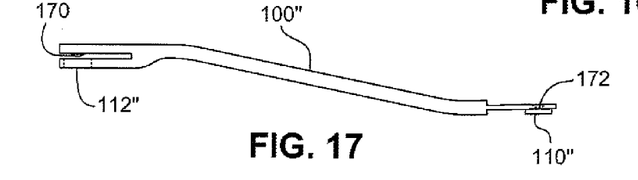
FIG. 17 is a top view of the embodiment of FIG. 16.
Figure 18:
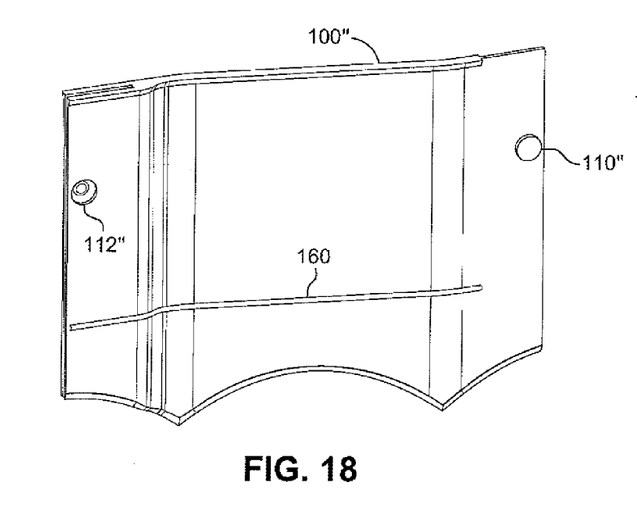
FIG. 18 is a perspective view of the embodiment of FIG. 16.
Figure 19:
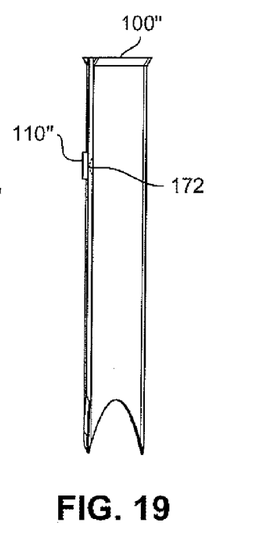
FIG. 19 is a side view of the embodiment of FIG. 16.

Referring to FIG. 16, an apparatus 100" is shown implementing an alternate embodiment of the present invention. The apparatus 100" is shown with a connection piece 110" and a receptacle 112". The receptacle 112" may be implemented as a generally U-slot design. The apparatus 100a" is shown having a respective depth guide 160. The depth guide 160 provides a guide to show how deep the apparatus 100" is inserted into the ground. Referring to FIG. 17, a top view of the alternate embodiment 100" is shown. Referring to FIG. 18, a back side perspective view of the alternate embodiment 100" is shown. Referring to FIG. 19, a side view of the apparatus 100" is shown. The connection piece 110" is shown generally extending from the apparatus 100". The connection piece 110" may be formed as an extended piece in a generally circular configuration. The receptacle 112" may be formed as a slot within the apparatus. A dimple (or bump) 170 may be formed within the receptacle 112" to provide an interlock type connection with the divot 172 when the connection piece 110" is positioned within the receptacle 112". A divot 172 may be formed in the connection piece 110".

Figure 20:
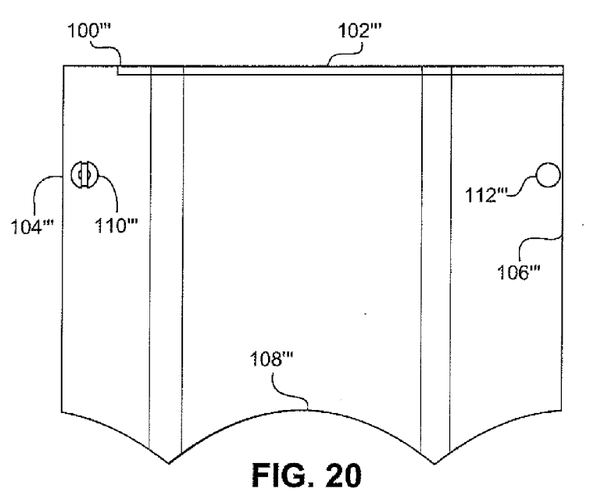
FIG. 20 is a diagram illustrating another alternate embodiment of the present invention.
Figure 21:
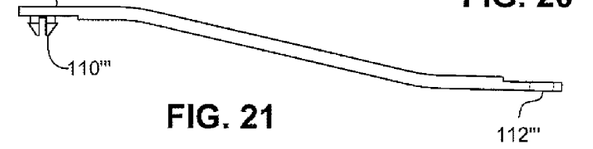
FIG. 21 is a diagram illustrating a top view of the embodiment of FIG. 20.

Referring to FIG. 20, an apparatus 100''' is shown implementing an alternate embodiment. The apparatus 100''' is shown implementing a connection piece 110''' and a receptacle 112'''. The connection piece 110''' and the receptacle 112''' may be implemented similar to the connection piece 110 described in connection with FIGS. 5a-5d. The connection pieces 110a-110n may be implemented using a push pin type of arrangement. For example, the connection pieces 110a-110n may have two or more flexible portions that may be configured to flex when inserted into the receptacles 112a-112n. After insertion, the flexible portions may be configured to securely hold the connection pieces 110a-110n within the respective receptacles 112a-112n. Referring to FIG. 21, a top view of the apparatus 100''' is shown.

Figure 22:
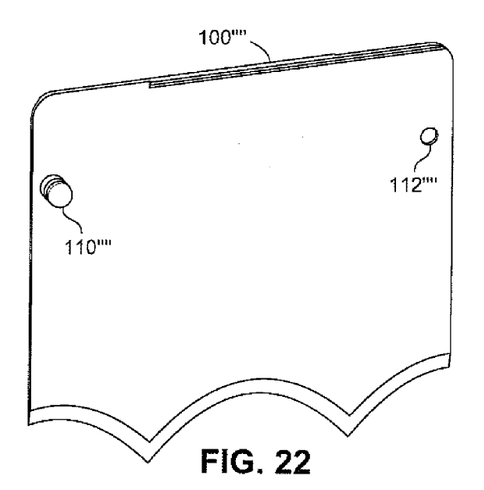
FIG. 22 is a diagram illustrating another alternate embodiment of the present invention.
Figure 23:
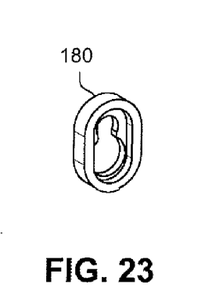
FIG. 23 is a diagram of a connection piece that may be used with the piece of FIG. 22.

Referring to FIG. 22, an apparatus 100'''' is shown. The apparatus 100'''' is shown having a connection piece 110'''' and a receptacle 112''''. The connection piece 110'''' may be implemented as an integrated plastic post. The connection piece 110'''' may be inserted through the receptacle 112''''. Referring to FIG. 23, a diagram of a clip 180 is shown. The clip 180 may be implemented as a plastic lock that secures to the exposed end of the connection piece 110''''.

Figures 24A, 24B:
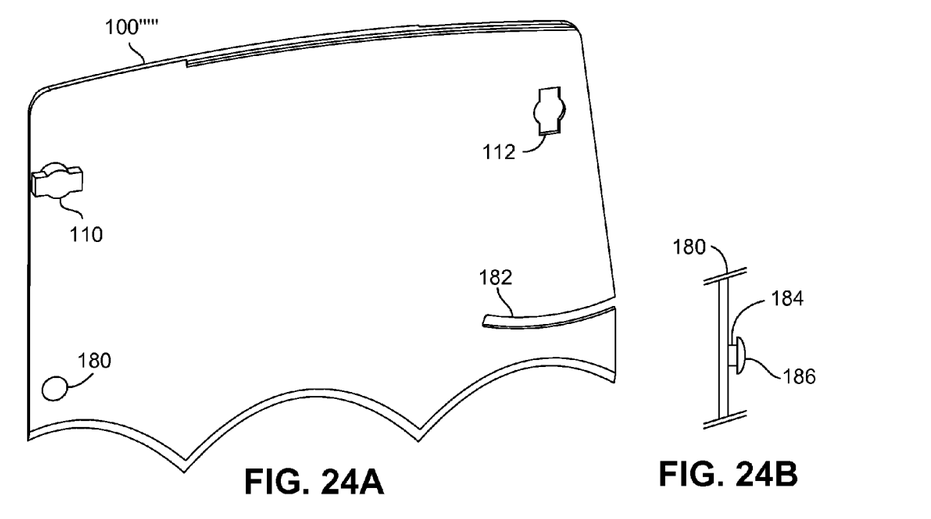
FIGS. 24A and 24B are diagrams illustrating another alternate embodiment.

Referring to FIG. 24A, a diagram of an apparatus 100''''' is shown. In addition to the connection piece 110 and the receptacle 112, a lower lock 180 and a channel 182 are shown. Referring to FIG. 24B, the lower lock 180 is shown configured as a pin portion 184 and a cap portion 186 that may be configured to slide into the channel 182 of the apparatus 100'''''. The channel 182 may be configured to guide the lower lock 180. The pin portion 184 may slide in the channel 182. The cap portion 186 may prevent a lower portion of one of the apparatus 100''''' from separating from another one of the apparatus 100''''' once the pin portion 184 slides into the channel 182. The lower lock 180 and the channel 182 may also be implemented with a variety of the connection pieces 110 and receptacle 112 described throughout the application.

Figure 25:
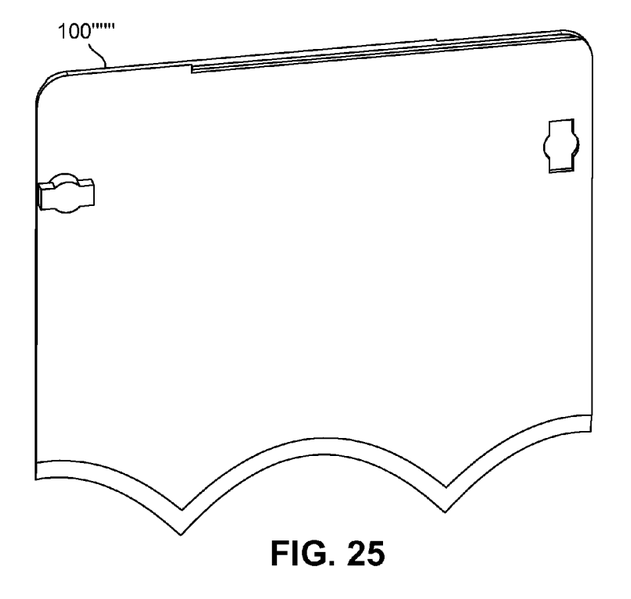
FIG. 25 is a diagram illustrating another alternate embodiment of the present invention.

Referring to FIG. 25, a diagram of an apparatus 100'''''' is shown implementing an alternate embodiment. The apparatus 100'''''' is shown in a generally smooth base. In general, the apparatus 100, or any of the alternate apparatus described throughout the specification, may be implemented having a curved base (e.g., with one or more sections as shown in FIG. 3) or a smooth base (e.g., as shown in FIG. 25.).

Figure 26:
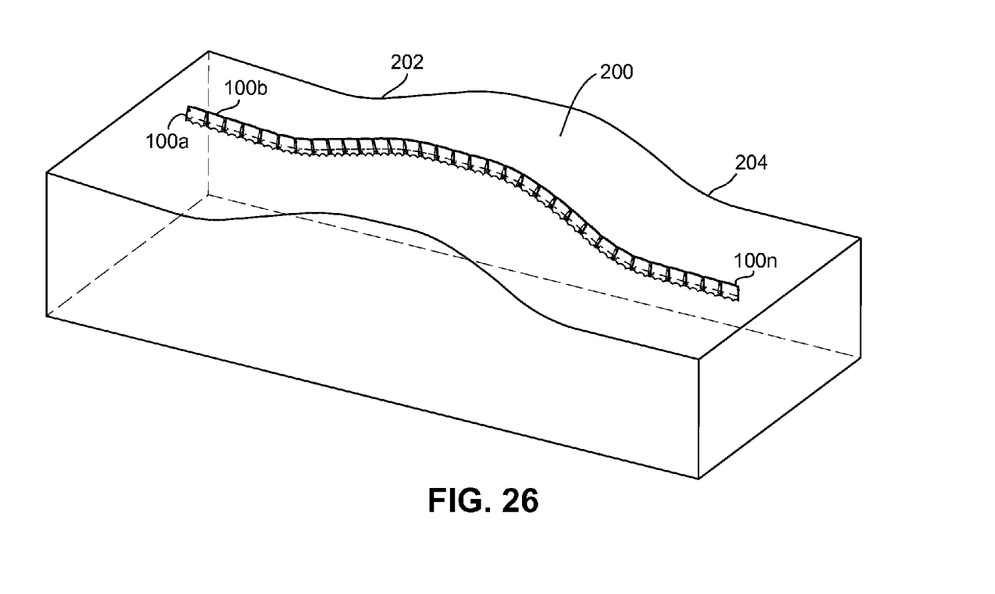
FIG. 26 is a diagram of an edging strip assembled on a rolling hill.

Referring to FIG. 26, a lawn strip is shown comprising a plurality of the apparatus 100a-100n. The plurality of apparatus 110a-110n is shown, accommodating a hill 200. The hill 200 may have a first slope 202 and a second slope 204. The plurality of the apparatus 100a-100n can accommodate both the slope 202 and the slope 204, as well as other slopes that may be encountered.

Figure 27:
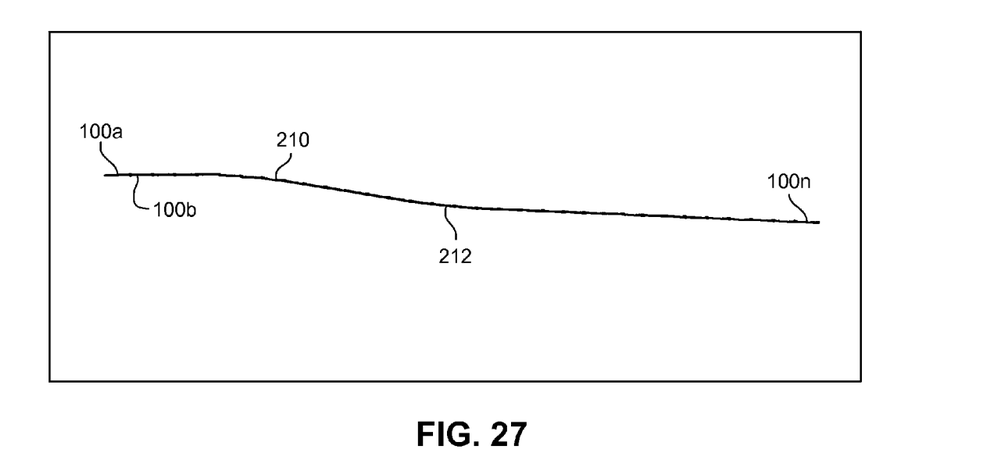
FIG. 27 is a top view of the edging step of FIG. 26.
Figure 28:
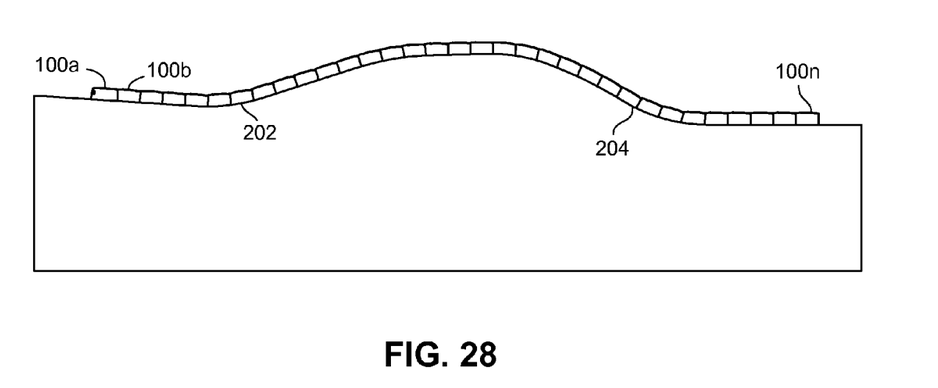
FIG. 28 is a side view of the edging step of FIG. 26.

Referring to FIG. 27, a top view of the plurality of apparatus 100a-100n are shown. The plurality of apparatus 100a-100n is shown flexing about a bend 210 and a bend 212. The particular number of bends 210 and 212 may be varied to meet the design criteria of a particular implementation. Referring to FIG. 28, a side view of the plurality of apparatus 100a-100n is shown.

While the invention has been particularly shown and described with reference to the preferred embodiments thereof, it will be understood by those skilled in the art that various changes in form and details may be made without departing from the spirit and scope of the invention.

The invention claimed is:

1. A lawn and/or garden apparatus comprising:
   a main portion having a top, a first side, a second side, a bottom, a first face and a second face;
   a connector positioned to extend in a perpendicular direction from said first face of said main portion near said first side, wherein (i) said connector has a first portion and a second portion, (ii) said first portion is connected between said main portion and said second portion, (iii) said second portion is wider than said first portion and (iv) said connector and said main portion are formed as a single structure using a uniform rigid material;
   a receptacle positioned between said first face and said second face of said main portion near said second side, wherein (a) said connector locks into a second receptacle of a second apparatus having a similar configuration as said first receptacle, (b) said apparatus and said second apparatus pivot about a connection point of said receptacle and said connector and (c) said connection point causes said apparatus and said second apparatus to pivot about a horizontal axis substantially aligned with a longitudinal axis of said connector.

2. The apparatus according to claim 1, wherein said connector is configured to be removably locked into said second receptacle.

3. The apparatus according to claim 1, wherein said second receptacle is positioned on a second apparatus such that a plurality of said apparatus are connected together.

4. The apparatus according to claim 1, wherein said bottom is configured to have a sharp edge sufficient to cut through a grass layer of a lawn or garden.

5. The apparatus according to claim 1, wherein said bottom comprises a plurality of curved portions configured to form one or more points.

6. The apparatus according to claim 5, wherein said one or more points are configured to cut through a grass layer of a lawn or garden.

7. The apparatus according to claim 1, wherein a plurality of said apparatus are configured to form an edging suitable for use in a lawn or garden.

8. The apparatus according to claim 7, wherein said plurality of said apparatus are configured to provide one or more pivot points along a horizontal axis to be suitable for use on a hill, wherein said pivot points are formed about each of said connection points between said receptacles and said connectors.

9. The apparatus according to claim 8, wherein said pivot points on said horizontal axis allow said plurality of apparatus to create an angle at each of said pivot points.

10. The apparatus according to claim 1, wherein said connector has a long side and a short side such that said connector is pushed through said receptacle at a first orientation, then twisted approximately 90 degrees to a second orientation.

11. The apparatus according to claim 10, wherein said first orientation is an unlocked orientation and said second orientation is a locked orientation.

12. The apparatus according to claim 1, wherein a second connector is positioned separately from said apparatus and configured to provide a plug to a second receptacle.

13. The apparatus according to claim 1, wherein said apparatus comprises a bend in said main portion configured to provide a turn when a plurality of said apparatus are connected together.

14. The apparatus according to claim 1, wherein said connector comprises a slot shape and a circular bump and said connector comprises a circular projection and divot, wherein said connector and said receptacle form an interlocked connection.

15. The apparatus according to claim 1, wherein said connector comprises a plurality of flexible pieces configured to flex when inserted into said receptacle.

16. A lawn and/or garden apparatus comprising:
a main portion having a top, a first side, a second side, a bottom, a first face and a second face;
a connector positioned to extend in a perpendicular direction from said first face of said main portion near said first side, wherein (i) said connector has a first portion and a second portion, (ii) said first portion is connected between said main portion and said second portion, (iii) said second portion is wider than said first portion and (iv) said connector and said main portion are formed as a single structure using a uniform rigid material;
a receptacle positioned between said first face and said second face of said main portion near said second side, wherein (A) said connector locks into a second receptacle of a second apparatus having a similar configuration as said first receptacle, (B) said apparatus and said second apparatus pivot about said connection of said receptacle and said connector and said connection point causes said apparatus and said second apparatus to pivot about a horizontal axis substantially aligned with a longitudinal axis of said connector;
a bottom connector rigidly positioned to extend from said main portion near said bottom of said first side; and
a curved portion configured to lock into said bottom connector.

17. The apparatus according to claim 16, wherein said bottom connector is configured to allow a second curved portion to slide and lock into said bottom connector.

18. The apparatus according to claim 16, wherein said bottom connector comprises a pin and a cap and said curved portion comprises a channel, wherein said pin is configured to slide into said channel.

* * * * *